(12) United States Patent
Wu et al.

(10) Patent No.: US 8,473,476 B2
(45) Date of Patent: Jun. 25, 2013

(54) EFFICIENT DATABASE SEARCH FOR UNIQUE INDENTIFIERS

(75) Inventors: Guangnian Wu, Kanata (CA); Tibor Fasanga, Stittsville (CA)

(73) Assignee: Alcatel Lucent, Paris (FR)

( * ) Notice: Subject to any disclaimer, the term of this patent is extended or adjusted under 35 U.S.C. 154(b) by 99 days.

(21) Appl. No.: 12/895,240

(22) Filed: Sep. 30, 2010

(65) Prior Publication Data

US 2012/0084307 A1   Apr. 5, 2012

(51) Int. Cl.
*G06F 17/30* (2006.01)

(52) U.S. Cl.
USPC ........... 707/706; 706/713; 706/722; 706/736; 706/758; 706/781

(58) Field of Classification Search
USPC .................................. 707/600–899
See application file for complete search history.

(56) References Cited

U.S. PATENT DOCUMENTS 7,113,297 B1 * 9/2006 Yamaguchi et al. ......... 358/1.15
2009/0144268 A1 * 6/2009 Nagase ............................ 707/5

* cited by examiner

*Primary Examiner* — Issac M Woo
(74) *Attorney, Agent, or Firm* — Kramer & Amado, P.C.

(57) ABSTRACT

The invention is directed to providing an improved method of determining available identifiers (IDs) in a database, especially in the context of using available IDs for provisioning services in a telecommunications system. The method performs a database query for a range of IDs and stores candidate IDs in a local pre-fetch ID set.

19 Claims, 3 Drawing Sheets

EFFICIENT DATABASE SEARCH FOR UNIQUE INDENTIFIERS

FIELD OF THE INVENTION

The invention is directed to database searching and in particular to finding a unique identifier in a database of a telecommunication system.

BACKGROUND OF THE INVENTION

An important aspect of Operations, Administration, and Maintenance (OA&M) of telecommunication systems, is provisioning of services. Services are referenced by identifiers, and provisioning details for each service are stored in databases, for access by a Network Management System (NMS). Identifiers are used for: communications interfaces; and services, such as policies, tunnels, label-switched paths (LSP), etc. Point-to-multipoint LSPs in packet switching telecommunications systems typically have identifier (ID) ranges of 1 to 1024 per network node or network element (NE), and identifier ranges could be much larger, such as for example, 65,000 or more. Some tables can even have millions of records.

Typically, in order to provision a new service in a telecommunication system, an operator needs to select an available or unused identifier from a range of identifiers, in order to reference the new service. This is typically done using database query such as a Structured Query Language (SQL) query to a service table located on a database, for an available identifier.

For initial provisioning of services, identifiers can be selected sequentially. Bulk provisioning is often carried out to assign services in blocks, for example, 20 identifiers could be selected for a single customer to provision a group of services, but only 15 end up being provisioned. Over time, some previously provisioned services could be deleted. Both of these scenarios will leave available identifiers interspersed among identifiers in use. It is important to be able to make use of these available identifiers because the address space or identifier range is typically finite.

With reference to FIG. 1, system 100 illustrates network management system 101 in communication with a database 103, in a scenario where there are only a few free or available identifiers (IDs) 500 and 1001 left on a moderate target range of 1 to 1024 on the database 103. A prior art process to find an available ID would query each identifier one-by-one and check on each for availability (i.e. not present in database) with an individual query. Thus the process starts with a candidate ID initialized to 0. At step 105 the candidate ID is incremented. At step 107 the database is queried for the individual candidate ID. This can be done with an SQL database query such as:

```
AUTO_INCREMENT
SELECT Object ID FROM Table1 WHERE (ID = 3 AND
    NodeID =2.2.2.2)
```

At step 109 the availability of the candidate is returned to the network management system 101. Using this process it would take 500 queries to the database to find the first available ID (500) and another 521 queries to find the next available ID (1021). Doing multiple database queries is "expensive" in terms of resource usage, and especially so when target ID space is heavily utilized and available IDs are interspersed among IDs in use.

Therefore, an improved method or system for determining available IDs in a database would be highly desirable.

SUMMARY OF THE INVENTION

An aspect of an embodiment of the present invention is directed to providing a method of searching a database for a unique identifier (ID). The method comprises steps of: performing a database query for a pre-fetch ID set for a pre-defined range of candidate IDs; and determining an available ID within the pre-fetch ID set.

In some embodiments of the present invention, the pre-fetch ID set contains all the used IDs for said predefined range of candidate IDs.

Some embodiments of the present invention further comprise a step of repeating the step of determining an available ID.

Some embodiments of the present invention further comprise steps of: incrementing the starting candidate ID by the predefined range; and repeating the step of performing a database query.

In some embodiments of the present invention, the predefined range comprises an order of magnitude less than a total ID range space.

In some embodiments of the present invention, the predefined range comprises between 5% and 20% of a total ID range space.

In some embodiments of the present invention, the database query comprises a Structured Query Language (SQL) query.

Some embodiments of the present invention further comprise steps of: provisioning services in a telecommunication system, using the available ID.

In some embodiments of the present invention, the database comprises a network management system database.

Another aspect of an embodiment of the present invention provides a program storage device readable by a machine, tangibly embodying a program of instructions executable by the machine to perform steps of the methods described above.

BRIEF DESCRIPTION OF THE DRAWINGS

Some embodiments of apparatus and/or methods in accordance with embodiments of the present invention are now described, by way of example only, and with reference to the accompanying drawings in which.

In the figures, like features are denoted by like reference characters.

DETAILED DESCRIPTION

Figure 2:
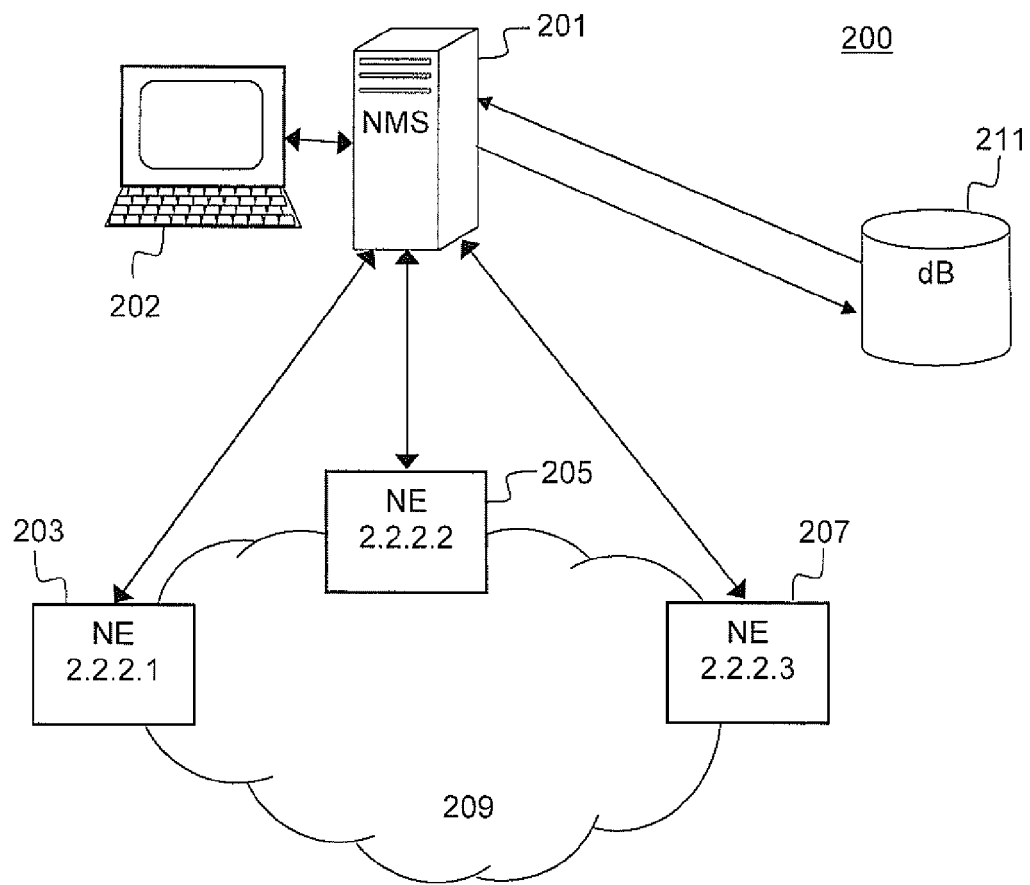
FIG. 2 illustrates a method for searching for an available ID within a database according to an embodiment of the present invention.

FIG. 2 illustrates a services provisioning context in a telecommunication system 200 for the present invention. Network Management System (NMS) 201 controls network elements 203, 205, 207 of network 200. Network management functions, such as OA&M activities, including provisioning of services can be initiated by an operator from operator interface 202. NMS 201 stores network provisioning data in database 211.

The database 211 is managed using a relational database management system (RDBMS) such as for example, Oracle RDBMS from Oracle Corporation, using a database query language such as for example, Structured Query Language (SQL).

Provisioned telecommunication services are stored in database 211 in tables such as shown in Table 1 below. The column labeled "ID" contains IDs used as unique indexes per node ID for the individual provisioned services. Note that ID "1" appears in both the first and second data rows of Table 1. The IDs are unique for each node, not necessarily unique to the table. e.g. node 2.2.2.1 and node 2.2.2.2 could use the same ID. The "Name" column contains mnemonic names for the services. The "Node ID" column contains the Node ID on which each service is provisioned. The "Object ID" column contains the object ID of each service.

TABLE 1

| ID | Name | Node ID | Object ID |
|---|---|---|---|
| 1 | Telco_1_LSP_1 | 2.2.2.1 | 100 |
| 1 | Telco_1_LSP_2 | 2.2.2.2 | 200 |
| ... | ... | ... | ... |
| 2000 | Telco_2 LSP_16 | 2.2.2.2 | 10000 |
| ... | ... | ... | ... |
| 25392 | Enterprise_6_VPN | 2.2.2.3 | 13000 |

Figure 1:
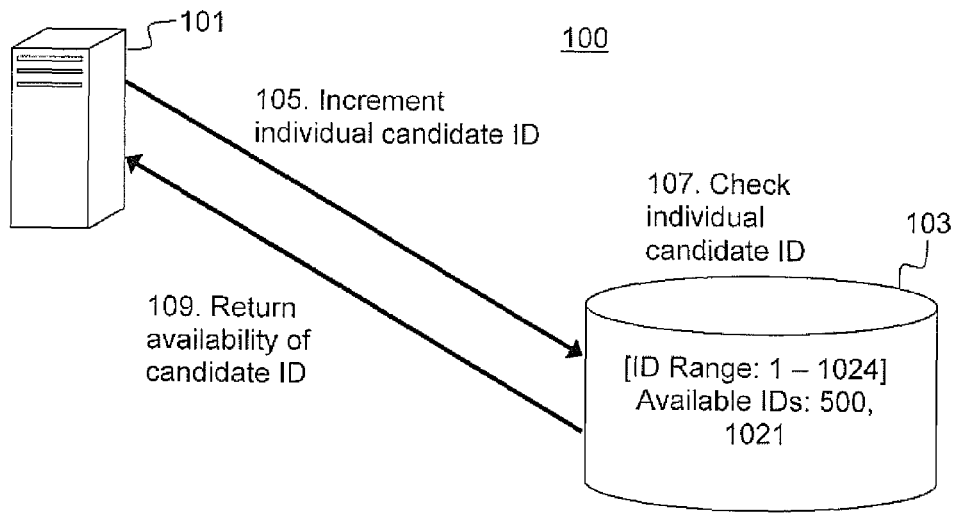
FIG. 1 illustrates a prior art method for searching for an available ID within a database.
Figure 3:
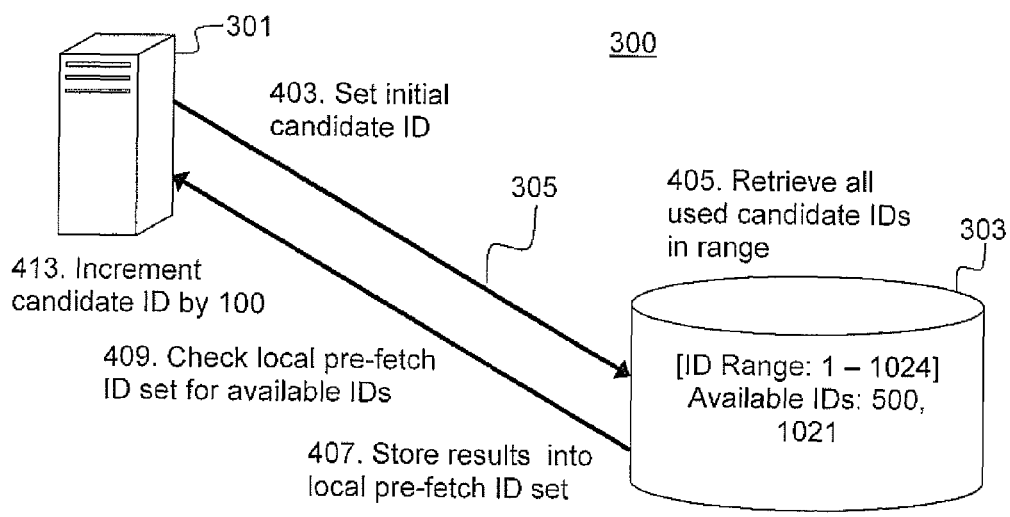
FIG. 3 illustrates a services provisioning context in a telecommunication system for which the present invention is well suited.
Figure 4:
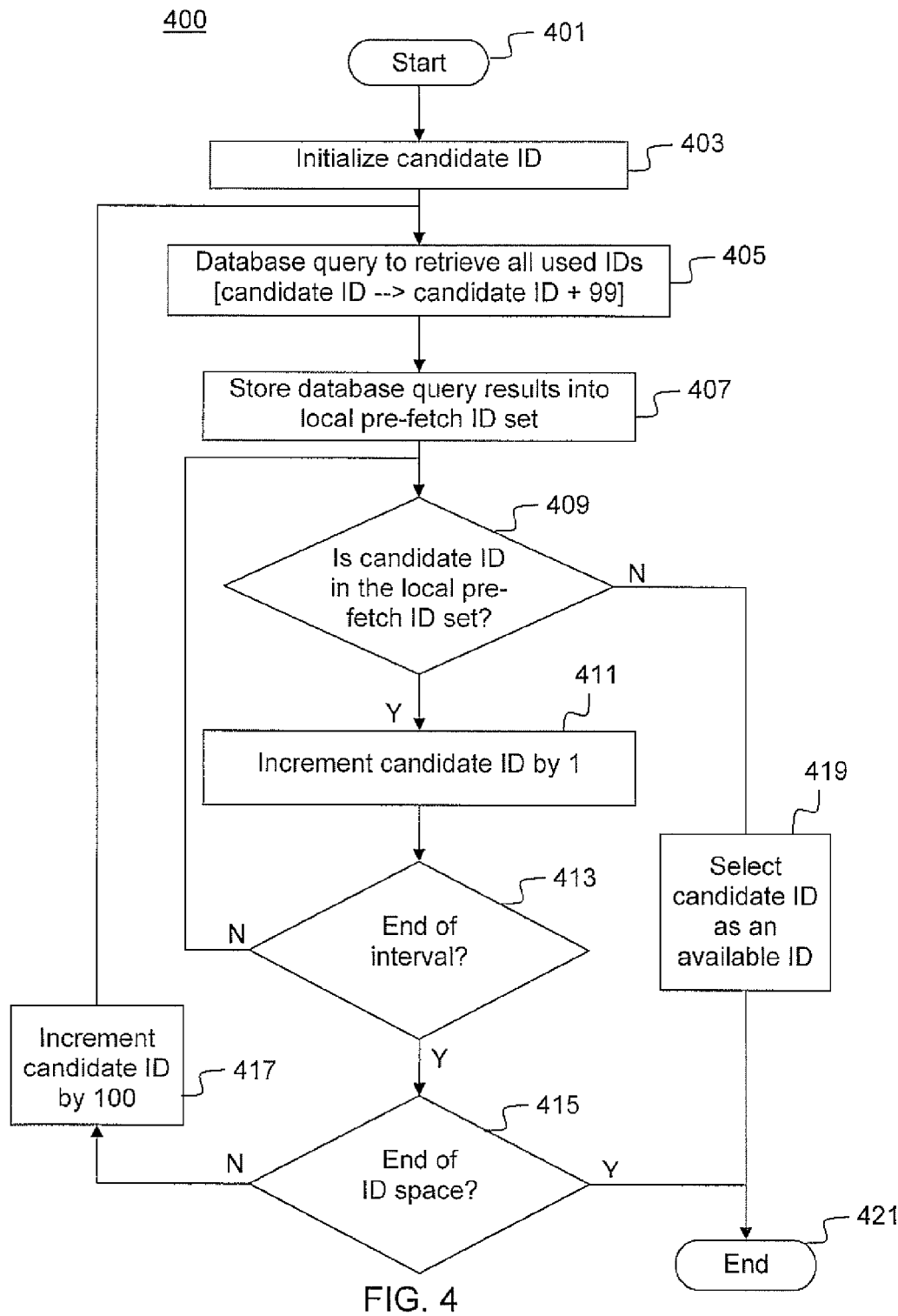
FIG. 4 illustrates a flowchart depicting a method for searching for an available ID within a database according to an embodiment of the present invention.

Referring to FIG. 3, and FIG. 4, system 300 illustrates network management system 301 in communication with a database 303, in a scenario where there are only a few free or available IDs: 500 and 1001 left on a moderate target range of 1 to 1024 on the database 303. This scenario is similar to that illustrated in FIG. 1, but the embodiment of FIG. 3 provides a more efficient method for determining available IDs in database 303.

The process starts at step 403 where the candidate ID is set to an initial value. At step 405 the database is queried to retrieve all the used IDs in predefined range of ID values starting from the initial value of step 403. In the example of FIG. 3, the predefined range is set to 100. Thus for the first iteration of step 405, the query retrieves the IDs between 1 and 1+99=100. Note that it is useful to set the predefined range to a subset of the total ID range of the database, for example, an order of magnitude less than the total ID range. The database query of step 405 can be performed with an SQL database query such as:

SELECT ID FROM Table1 WHERE ((ID >= 1 AND ID <= 100) AND NodeID = 2.2.2.2)

At step 407, the results are stored in a local pre-fetch ID set in memory of the NMS 301 The memory of the NMS 301 is local to the NMS 301 and is much faster to access than the database which is typically, high capacity, such as a hard disk drive with associated disk access delays, and in communication with the NMS 301 via communication link 305 with associated delays and latencies. Thus the process reduces the number of individual queries to the database which can be considered "expensive" in terms of resources and time delay, with a tradeoff of some local memory space in local memory to buffer the pre-fetch ID set.

At step 409 the process finds the lowest unused ID in the given interval with the help of the pre-fetch ID set in local memory of the NMS 301. The search for the lowest ID in the interval is performed as follows: Start with the lowest ID of the interval which is equal to the initial candidate ID. Check if the candidate ID is used (The candidate ID is used if it is included in the local pre-fetch ID set). If the candidate ID is not in the pre-fetch ID set, then the candidate ID is unused and at step 419 it will be selected as the available ID. If the candidate ID is used, then at step 411, the candidate ID is incremented by 1 and the search in the current interval is repeated until an unused ID is found or the candidate ID is outside of the current range—meaning that at step 413, the process determines that the current range is exhausted. Note that no database access is required during this interval search and other implementations of an interval search using local memory are contemplated as falling within the scope of the present invention.

Embodiments of the present invention fetch all the used IDs within a predefined range with a single database query, store the result in a local pre-fetch ID set, and then start looking for the first unused ID in the current interval by using the local pre-fetch set. In situations where multiple available IDs are required, as in the case of bulk provisioning of multiple services, the process can continue to find and use available IDs from the current interval by using the pre-fetch ID set. When the current range has been exhausted of available IDs, at step 415 the process determines if there is still more total ID range to search within the total ID space and if so the process continues to step 417 where the process increments the initial candidate ID by the predefined range, in this example, the process increments by 100, and the process repeats at step 405. Thus the process will perform another iteration of the database query with the next range.

In the scenario of FIG. 3, it will take only 5 queries to the database to find the first available ID (500) and subsequently, 6 database queries to find the following available ID (1021) subsequent searches will be equally resource-efficient, in contrast to the process of the prior art.

Using table indexes can improve database access speed. For example to optimize the performance of the SQL query shown in [0026] the database table Table 1 could be indexed by fields 'ID' and 'Node ID'.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method of searching a database for a unique identifier (ID), the method comprising steps of:
    performing a database query for a pre-fetch ID set for a predefined range of candidate IDs; and
    determining an available ID within said pre-fetch ID set.

2. The method of claim 1, wherein said pre-fetch ID set contains all the used IDs for said predefined range of candidate IDs.

3. The method of claim 1, further comprising a step of repeating said step of determining an available ID.

4. The method of claim 3, further comprising steps of:
    incrementing said starting candidate ID by said predefined range; and
    repeating said step of performing a database query.

5. The method of claim 4, wherein said predefined range comprises an order of magnitude less than a total ID range space.

6. The method of claim 4, wherein said predefined range comprises between 5% and 20% of a total ID range space.

7. The method of claim 1 wherein said database query comprises a Structured Query Language (SQL) query.

8. The method of claim 1 further comprising steps of:
    provisioning services in a telecommunication system, using said available ID.

9. The method of claim 8, wherein said database comprises a network management system database.

10. A program storage device readable by a machine, tangibly embodying a program of instructions executable by the machine to perform steps of the method of claim 1.

11. A non-transitory machine-readable storage medium encoded with instructions that when executed by a processor perform a method of searching a database for a unique identifier (ID), the non-transitory machine-readable storage medium comprising:
    instructions for performing a database query for a pre-fetch ID set for a predefined range of candidate IDs; and
    instructions for determining an available ID within said pre-fetch ID set.

12. The non-transitory machine-readable storage medium of claim 11, wherein said pre-fetch ID set contains all the used IDs for said predefined range of candidate IDs.

13. The non-transitory machine-readable storage medium of claim 11, further comprising instructions for repeating said instructions for determining an available ID.

14. The non-transitory machine-readable storage medium of claim 13, further comprising:
    instructions for incrementing said starting candidate ID by said predefined range; and
    instructions for repeating said instructions for performing a database query.

15. The non-transitory machine-readable storage medium of claim 14, wherein said predefined range comprises an order of magnitude less than a total ID range space.

16. The non-transitory machine-readable storage medium of claim 14, wherein said predefined range comprises between 5% and 20% of a total ID range space.

17. The non-transitory machine-readable storage medium of claim 11 wherein said database query comprises a Structured Query Language (SQL) query.

18. The non-transitory machine-readable storage medium of claim 11 further comprising:
    instructions for provisioning services in a telecommunication system, using said available ID.

19. The non-transitory machine-readable storage medium of claim 18, wherein said database comprises a network management system database.

* * * * *